US008910462B2

(12) United States Patent
De Smet et al.

(10) Patent No.: US 8,910,462 B2
(45) Date of Patent: Dec. 16, 2014

(54) LAY-OUT FOR SPLICING STRIPS COMPRISING CORDS

(75) Inventors: Anneleen De Smet, Kruishoutem (BE); Frederik Vervaecke, Ghent (BE)

(73) Assignee: NV Bekaert SA, Zwevegem (BE)

( * ) Notice: Subject to any disclaimer, the term of this patent is extended or adjusted under 35 U.S.C. 154(b) by 160 days.

(21) Appl. No.: 13/637,560

(22) PCT Filed: Mar. 28, 2011

(86) PCT No.: PCT/EP2011/054674
§ 371 (c)(1), (2), (4) Date: Sep. 26, 2012

(87) PCT Pub. No.: WO2011/120892
PCT Pub. Date: Oct. 6, 2011

(65) Prior Publication Data
US 2013/0025089 A1 Jan. 31, 2013

(30) Foreign Application Priority Data
Mar. 30, 2010 (EP) .................................... 10158307

(51) Int. Cl.
*F16G 3/10* (2006.01)
*B29C 65/00* (2006.01)

(52) U.S. Cl.
CPC .............. *F16G 3/10* (2013.01); *B29C 66/1142* (2013.01); *B29C 66/71* (2013.01); *B29C 66/72141* (2013.01); *B29C 66/43* (2013.01); *B29C 66/4324* (2013.01); *B29C 66/7212* (2013.01); *B29C 66/73921* (2013.01)
USPC ........................................................... 57/202

(58) Field of Classification Search
CPC B29D 29/00; B29C 66/1142; B29C 66/4324; B29C 66/72141; B29C 66/43; B65H 21/00; F16G 3/10
USPC .......... 57/21, 22, 201, 202; 428/58, 60, 292.1
See application file for complete search history.

(56) References Cited

U.S. PATENT DOCUMENTS 1,735,686 A 11/1929 Kimmich
3,101,290 A 8/1963 Paul (Continued)

FOREIGN PATENT DOCUMENTS

DE 39 00 911 A1 11/1989
EP 0 967 409 A1 12/1999

(Continued)

OTHER PUBLICATIONS

U.S. Appl. No. 13/637,574, filed Sep. 26, 2012, De Smet.
M. Hager et al., Design of Steel Cord Conveyor Belt Splices, Bulk Solids Handling, Nov. 1991, vol. 11, No. 4, pp. 231-242.
W. H. Press et al, Combinatorial Minimization: Method of Simulated Annealing, Numerical Recipes in Pascal, The Art of Scientific Computing, 1989, pp. 366-374.

(Continued)

*Primary Examiner* — Shaun R Hurley
(74) *Attorney, Agent, or Firm* — Foley & Lardner LLP

(57) ABSTRACT

A plain stepped splice lay-out scheme is presented that can be used for splicing strips to one another that comprise longitudinally arranged cords. The strips can take the form of a conveyor belt, transmission belt, timing belt, elevator belt, a rubber track or a reinforcing strip. The splice is optimised for uniform bending stiffness and maximum strength retention. The cross section of the strip and the splice are substantially equal: there is no increase in thickness or width at the splice. The splice lay-out is characterised by the fact that the abutments (130)—those positions where cord ends (111, 121) meet—are positioned sufficiently far away from one another and by preference as far away from one another as possible. Preferred embodiments in terms of length common between cords of the different strips and local strength are given.

15 Claims, 1 Drawing Sheet a b c
120 140 121 130 111 110 L q p
1 2 3 4 5 6
A B C D
rST (%)
(2;1;3;4;2;6)

(56) References Cited

U.S. PATENT DOCUMENTS

| | | | | |
|---|---|---|---|---|
| 3,234,611 | A | 2/1966 | Paasche | |
| 3,419,449 | A | 12/1968 | Valerio et al. | |
| 3,481,807 | A | 12/1969 | Kanamori | |
| 3,487,871 | A * | 1/1970 | Kanamori | 156/266 |
| 3,724,645 | A * | 4/1973 | Spaar | 198/847 |
| 4,564,542 | A * | 1/1986 | Worcester | 428/58 |
| 4,618,387 | A * | 10/1986 | Fisher et al. | 156/244.11 |
| 7,438,778 | B2 * | 10/2008 | Tsuru | 156/159 |
| 7,521,105 | B2 * | 4/2009 | Bech et al. | 428/60 |
| 8,252,411 | B2 * | 8/2012 | Veronesi et al. | 428/292.1 |
| 8,409,396 | B2 * | 4/2013 | Bech et al. | 156/304.5 |
| 2012/0043186 | A1 * | 2/2012 | Trieb | 198/847 |

FOREIGN PATENT DOCUMENTS

| | | | |
|---|---|---|---|
| FR | 2 914 040 | A1 | 9/2008 |
| GB | 858 403 | A | 1/1961 |
| WO | WO 2005/103545 | A1 | 11/2005 |
| WO | WO 2008/080715 | A1 | 7/2008 |
| WO | WO 2009/040628 | A1 | 4/2009 |

* cited by examiner

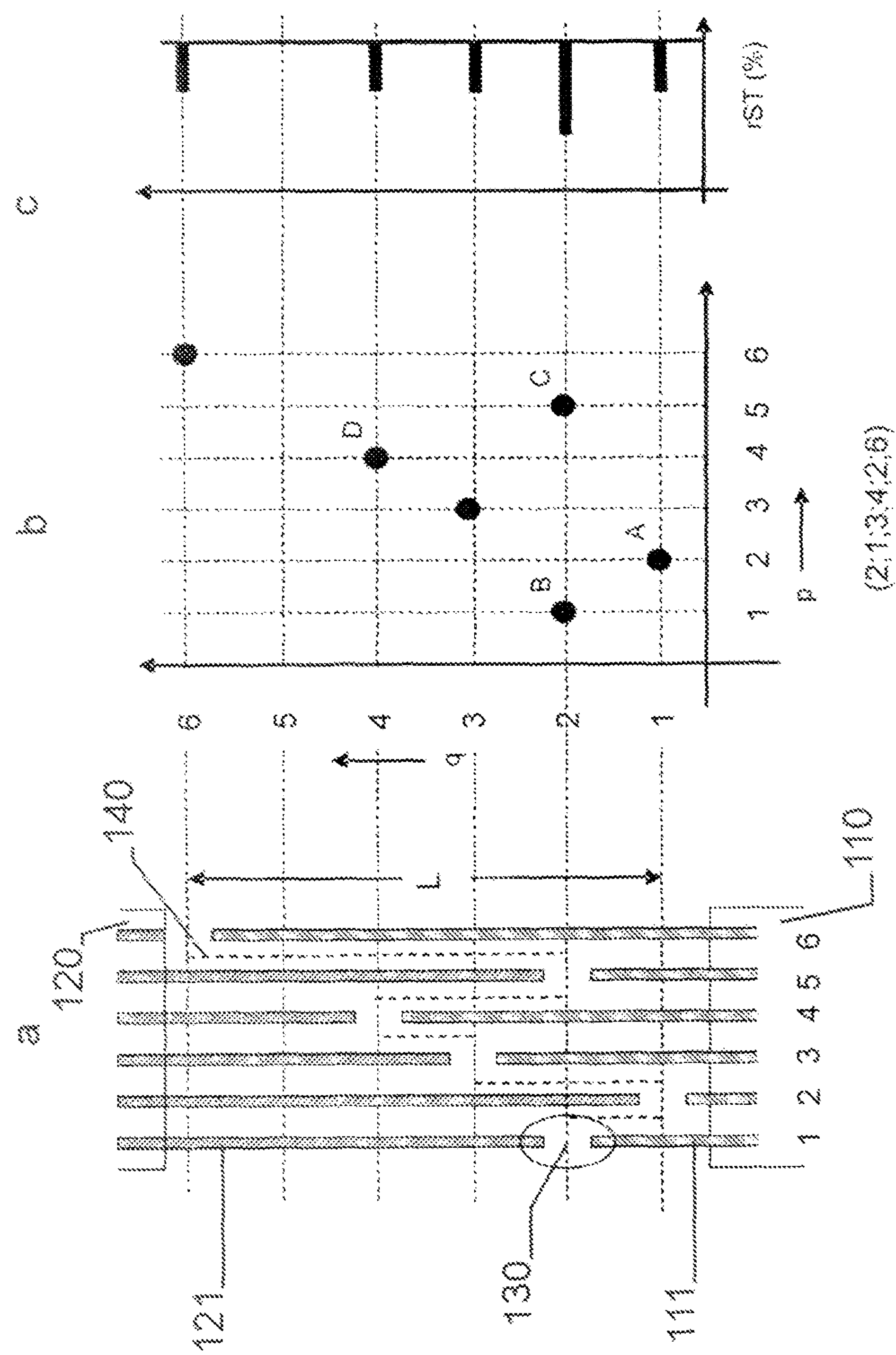
a
b
c
120
140
110
121
130
111
L
q
p
1 2 3 4 5 6
A
B
C
D
rST (%)
(2;1;3;4;2;6)

LAY-OUT FOR SPLICING STRIPS COMPRISING CORDS

TECHNICAL FIELD

The invention relates to a lay-out scheme for splices connecting strips reinforced with lengthwise arranged cords.

BACKGROUND ART

In many technical applications flexible belts or 'strips' are used. Such strips generally are made from elongated strength members, which will be called 'cords' hereinafter, arranged parallel to one another in the plane of the strip. In many cases the strips are encased in a polymer material or 'matrix' although other binding methods such as weaving or knitting are also possible to hold the cords together. The strips have a substantially oblong cross section. The anisotropic nature of such strips, being flexible in a direction perpendicular to the plane of the cords and rigid in that plane while being strong mainly in the lengthwise direction, makes them particularly suited to take up tension in static or dynamic applications.

In dynamic applications strips can be found as conveyor belts (to transfer materials), transmission belts (to transfer power) with a flat or with a teethed surface for optimum grip (the latter are known as synchronous or timing belts), elevator belts (to carry the cart of an elevator) or also as rubber tracks (for moving vehicles on difficult terrain). In static applications strips can be used to reinforce for example pipes wherein an internal tubular member is reinforced by helically wound strips around it (as described in FR 2914040 or WO 2002/090812).

Whenever a long length of strip is required it will be necessary to connect different shorter lengths of strip into a single long length. Such a connection is called a 'splice' or a 'joint'. Indeed, there is a maximum to the possible length of strip that can be uninterruptedly produced. For example for a conveyor belt, the length of a single stretch is limited by the magnitude and weight of the roll of belt that has to remain transportable to the installation site. Different stretches of belts are connected one to another on site. Finally the belt is closed by splicing the final closure over the driving drums and idlers. A good overview of different splicing families that are used in the field of conveyor belts can be found in "*Design of Steel Cord Conveyor Belt Splices*" by M. Hager and H. von der Wroge in "Belt Conveyor Technology, I/94" out of "The Best of Bulk Solids Handling 1986-1991" published by Trans Tech Publications.

Another need for strip splicing occurs when one wants to close a strip into a single loop i.e. to make it endless. This is for example the case for timing belts that are made in long lengths and afterwards cut to length and spliced. See e.g. U.S. Pat. No. 3,419,449.

An ideal splice should not be noticeable in the strip. The splice must therefore have:

(A). Equal breaking strength as the strip;

(B). Equal stiffness in stretching as well as in bending as the strip itself;

(C). Equal dimensions as the strip (no thicker sections)

(D). Show equal dynamic fatigue as the strip;

(E). Should be relatively easy to implement on site.

In principle an ideal splice could be made when the length of the splice is unlimited. However, this is not practical.

Hence, making practical splices is always compromising between the different requirements (A) to (E) mentioned above. One type of splice may therefore be perfectly fit in one application, but not for connecting another kind of strips in another application. The following splice methods are known:

Splice by means of mechanical fasteners: a row of clamps are attached to the edge of the belt that is cut perpendicular to its length. A connecting rod is introduced into the inter-digitised eyelets formed. This kind of splice is used for fabric reinforced types of strips. It can not be used for strips with mainly axial reinforcement (the clamps tear out). As the splice is like a hinge, it is more flexible than the strip itself.

Overlap splice: the ends of the strips are overlapped and are vulcanized or glued to one another. This kind of splice is sometimes used to make rubber tracks endless. It has an increased bending stiffness in the splicing area because the two cord planes of both ends do not coincide and form a stiff double layer.

Interlocking splice: the ends of the strips are cut in the plane of the strip according a pattern with protrusions and recesses that fit into one another (like a dovetail connection). Afterwards the splice is vulcanized or glued or molten together. See for example WO 2009/040628.

The following splices are described in ISO 15236-4.

Finger splices are splices in which the ends of the strips are cut into a mating saw tooth pattern. The 'fingers' are afterwards vulcanized to one another. It is mainly used for fabric reinforced belts or strips.

Interlaced stepped splices. Cord ends from one strip are arranged—'interlaced'—between cords of the other strip end and subsequently covered with rubber or polymer or glued together. The ends of the cords usually finish at regular positions in the splice hence its name of 'stepped splice'. In an 'interlaced stepped splice', the number of cords in the splice area is always larger than then number of cords in the strip. Interlaced stepped splices can only be used if the strip has less than about 50% packing degree. With packing degree is meant the ratio of the sum of all cord diameters to the total width of the strip. In case of a larger packing degree, some cords will have to be cut at the splice entry from both belts in order to accommodate space for the inserted cords. Although such a splice has a very good static strength (the splice can be stronger than the belt), it shows an increased stiffness in the splice area since more cords are present than in the strip itself.

Plain stepped splices. The number of cords within the splice remains equal to the number of cords in the strip. In other words: the cord ends of both strips abut to one another. Different lay-out patterns are possible such as an 'organ pipe splice' (having a repeating 01230123 . . . pattern, the numbers indicating the step length of the cord ends of one strip in the splice) or a 'fir tree splice' (having a repeating 01232100123210 . . . ) pattern. Such splices are difficult to discern from the strip itself in terms of bending stiffness, axial stiffness and section. However, they show a lower strength compared to 'Interlaced stepped splices'.

The inventors were primarily concerned with finding a splice that showed uniform bending properties over the splice. In second order—but still very important—there was the need to retain as much as possible strip strength through the splice. As the strip concerned has a rather high packing density (more than 50%) there was no other possibility than to opt for a "plain stepped splice". Although such type of splices are known for quite a long time (see e.g. U.S. Pat. No. 1,735,686 of 1926 and U.S. Pat. No. 3,101,290 of 1963) they found other and better ways of defining patterns and lay-outs that are the subject of this patent application.

DISCLOSURE OF INVENTION

It is therefore a first object of the invention to provide a splice that shows a substantially uniform bending stiffness in combination with sufficient strength retention and a splice section substantially equal to that of the strip. It is an object of the invention to provide a splice that can sustain at least half of the strength of the strip. It is further object of the invention to improve plain stepped splices outside the known 'organ pipe' or 'fir tree' lay-outs.

The invention concerns a splice (or 'joint' which is a synonym) that connects a first strip to a second strip. The strips comprise 'M' cords that are arranged in parallel to one another in the plane of the strip. 'M' can be any number but it is larger than or equal to twelve. In practice, the number of cords will be below 200.

'Cords' should be interpreted as being any kind of long and thin strength member. The cross section of the cords does not need to be round: it can also be irregular, oblong, rectangular or square. Examples are bundles of fibres, fibres twisted together into yarn, strands of filaments, filaments themselves, ropes of twisted strands and the like. The material the cords are made of is any kind of strong, fibre like material such natural materials (cotton, flax, wool, . . . ) or man-made materials made by chemical synthesis such as acrylic, rayon, nylon, polyethylene, polypropylene, polyaromatic fibres like aramid, or made from mineral materials such as glass fibres or made from metallic material such as steel fibres, filaments or cords, or any other kind of metallic alloys. Steel cords in the form of steel filaments, bundles of steel filaments, strands of steel filaments or steel ropes possibly in combination with other kinds of non-metallic filamentary materials are—for the purpose of this application—particularly preferred.

The cords in the strip are encased in a 'strip matrix'. The role of the matrix is to hold the cords in position in the strip. In its generality this will be a polymer material. The polymer material should be sufficiently flexible for the purpose the strip is intended for. Suitable polymeric materials are for example elastomer materials or rubber. They are extensively used in conveyor belts and timing belts. Other very suitable polymeric materials are thermoplastic polymers such as thermoplastic polyurethane (also used in timing belts and special purpose flat belts for use in the food industry), polyethylene, polypropylene, polyamide, this without being exhaustive.

In the splice, the cords are embedded in a splice matrix material. The splice matrix material can be equal or different from the strip matrix material. The splice matrix will have to carry all force over from the first strip to the second strip as will be explained hereinafter. When there is sufficient 'anchoring force' between the strip matrix material and the cords, there is no need to use an adapted material than the strip matrix material for the splice. In case the 'anchoring force' of the cords in the strip matrix is too low, a different 'splice matrix' material will have to be used in the splice area in order to be able to make a short enough splice.

The anchoring force of the splice matrix material can be improved by mixing a co-polymer and a base polymer wherein said co-polymer is a grafted co-polymer, a block co-polymer or a random co-polymer that is functionalised for enabling adhesion to the cords. The base polymer is by preference the same polymer as the strip matrix material, but this is not an absolute necessity.

The splice is particular in the lay-out or 'arrangement' of the cord ends.

The special arrangement is present for at least one group (but there may be more) of 'N' contiguous i.e. side-by-side cords (called 'a Group' when referred to in its generality or 'the Group' when a particular Group is meant) that can be identified in the total of 'M' cords in the splice. The invention will be clarified for such a Group of 'N' abutments and later restricted to the full width of the splice. It is immaterial how the remaining cords outside the Group are arranged. It suffices that at least one such Group can be identified that satisfies the requirements explained below.

FIG. 1'*a*' will be used for the clarification of the definitions used, but the shown splice arrangement in FIG. 1 obviously does not fall under the claims of the invention (at least 12 cords must be present in the strip).

In its generality the splice is a 'plain stepped splice'. Hence, corresponding cord ends 111, 121 of each strip-end 110, 120 will face one another at an 'abutment 130'. At the abutment the cord is interrupted and hence at the abutment no force is carried over from the first strip to the second strip by the cord. Ergo all force will have to be transmitted from the first strip to the second strip by mediation of the splice matrix material. In what follows we will number the 'N' cords within the Group with a cord index p=1, 2, 3, . . . , N. Matching cords of the other strip have the same index.

In the longitudinal direction of the Group, the abutments are regularly spaced apart over the length of the splice in the Group '$L_{group}$': it is the distance in longitudinal direction between the first and the last abutment when evolving from the first strip to the second strip in the Group. The abutments occur at positions that are in longitudinal direction a number of 'intervals' away from one another. The 'interval' 'Δ' is the smallest, non-zero distance in longitudinal direction of any possible pair of abutments within the Group. The distance between any pair of abutments can thus be 0 (abutments at the same level), 1, 2 or more times 'Δ'.

Conveniently, the interval 'Δ' can be taken to be equal to '$L_{group}/(N-1)$'. Hence, in longitudinal direction abutments can occur at positions q×Δ, 'q' being the level index which is an integer between 1 to N inclusive. In practice, one should not interpret these positions in their mathematical exactness: some play is possible because between abutting cord ends some distance will be present. For all practical purposes one should interpret these positions with an allowed error of less than '±Δ/2' or even less than '±Δ/4' or better.

It is a common practice when making splices to make the splice pattern not exactly perpendicular to the strip. A 'bias angle' is introduced making the overall splice area a parallelogram in stead of a rectangular. The purpose of such bias angle is to prevent an abrupt changeover from strip to splice. For example: a rectangular cut leads to pounding over drive drums in dynamic applications. This is prevented with a bias cut. Such a bias cut is also possible in the current splice arrangement with the only change that a biased base line must be used to define the positions of the abutments. The splice length l', which equal or larger than '$L_{group}$' is then the length of the longitudinally oriented edge of the parallelogram (and not the distance between first and last abutment along the strip). However, as it is inherent to the way the inventive splice is arranged, a smooth transition is guaranteed even when using a rectangular cut and a bias cut is no necessity but is allowed.

In this way a grid of possible abutments is defined in the Group of the splice: every abutment has a unique position (p,q). As every cord is cut all values from 1 to N must be present for 'p' (otherwise one of the cords would run uninterrupted from first to second strip). Also no two 'p' values can occur twice as otherwise a cord would be interrupted twice. The positions in the longitudinal direction—the level index—can only take values between 1 and N inclusive, but some q-values may occur more than once and others may not occur at all. Hence, each arrangement is uniquely and unambiguously defined by an N-tuple of integers ($q_1$; $q_2$; . . . ; $q_p$, . . . ; $q_N$) wherein each '$q_p$' has value between 1 and N. In this way any kind of plain stepped splice in a Group can be coded and represented on a grid as shown in FIG. 1'*b*'. The arrangements are coded in relation to the first strip end. The second strip is the 'complement' of the first one i.e. if the cord ends of the first strip are cut according ($q_1$; $q_2$; . . . ; $q_p$; . . . ; $q_N$)×Δ, the cord ends of the second strip must be cut according (N+1−$q_1$; N+1−$q_2$; . . . ; N+1−$q_N$)×Δ.

As each '$q_p$' can take 'N' different values, and there are N possible values of 'p' it follows that N×N×N . . . ×N (N times) i.e. $N^N$ plain step arrangements are possible for a Group. The amount of possible arrangements rapidly grows to astronomical proportions: in a Group with only 10 cords already $10^{10}$ possible plain stepped splice arrangements are possible. Some of those arrangements are obviously useless such as e.g. (1; 1; 1; . . . ; 1) or (N; N; . . . N) in which the abutments all come on a single line leading to a very weak and locally very flexible splice part. On the other hand it is not feasible to calculate through all these possible arrangements let alone to test them in practice.

Based on a series of trials with different plain stepped splice arrangements, such as (1; N; 1; N; . . . 1; N), (1; N; 2; (N−1); 3 . . . ; 1; N) and numerous other experiments, the inventors found that best results are obtained when the abutments are 'randomly' dispersed throughout the splice. In order to make this 'randomness' more deterministic the following rules were identified:

- When an abutment at position (p,q) is present there should be no other abutment present on the same position 'q' in nearby cords, say from 'p−n' to 'p+n' no other abutments should be present on the same level 'q'. This rule prevents the propagation of a tear through the splice. Indeed if abutments can be found too close to one another on the same level—even when there are one or two other cords in between—they will form a weak spot at which tearing will start or propagate.
- When an abutment at position (p,q) is present, there should not be another abutment close to it in the longitudinal direction in the cords adjacent to cord p. In other words in positions from q−(n−1) to q+(n−1) on cords p−1 and p+1, no other abutments should be present. This rule ensures that force transfer is maximal because the common overlap between cords adjacent to cord 'p' is maximal.

These two requirements can elegantly be combined using a taxi-metric. Given any pair A, X of abutments in the Group having coordinates ($p_A$,$q_A$) and ($p_X$,$q_X$), the taxi-distance d(A, X) is defined as:

$$d(A,X)=|p_A-p_X|+|q_A-q_X|$$

Alternatively this taxi-distance can be expressed as the sum '(i+1)+j' of:

- The number of cords 'i' counted in between A and X plus 1. It follows that if the cords are adjacent to one another this amounts to 1 (no cords are counted in between).
- The number of intervals 'j' counted along the longitudinal direction of the splice when going from A to X. If both $q_A$ and $q_B$ are equal, then 'j' is 0 (as no interval is counted).

For example in FIG. 1'*b*' the following taxi-distances are found (N=6):

$$d(A,B)=|2-1|+|1-2|=2$$

$$d(A,C)=|2-5|+|1-2|=4$$

$$d(A,D)=|2-4|+|4-1|=5$$

In order now that the presence of abutment X would not have a detrimental effect on the strength at abutment A, it is required that d(A,X)>n. Hence, in order to reduce the mutual influence of abutments to a minimum, the inventive splice arrangement in a Group is characterised in that any two abutments are at least a minimum distance 'n' away of one another. This 'n' should be at least four based on the practical experience of the inventors, but the higher the better, so 5, 6, 7, 8, 9, 10, . . . are also possible.

Put in other words: for any abutment A in a Group of the splice, the nearest neighbour B must be at a distance of 'n+1' or larger. Still otherwise formulated but again equivalent: the 'disc' around abutment 'A' with radius 'n' does not contain any other abutment. The disc in this metric are all those points X for which d(A,X)≤n. In this metric a disc becomes a rhombus with A at its centre and with diagonals 2n+1. Of course the rhombus is clipped at the edges of the splice grid.

When 'n' is equal to four (i.e. the nearest neighbour can be found at taxi-distance 5) only from N equal 12 and higher there exist solutions. It is likewise intuitively clear that there is a bound to the distance 'n+1' between nearest neighbouring abutments as every rhombus around an abutment reserves a certain number of points (namely 2n(n+1)) around it that can not be occupied by other abutments. So there is a maximum '$n_{max}$' for arrangements in which the distances between any pair of abutments is larger than '$n_{max}$'. This maximum depends on 'N'. It can be shown that the '$n_{max}$' and 'N' are related through (for '$n_{max}$' larger than 1):

$$\mathrm{INT}[(n_{max}^2/2)+n_{max}]=N$$

wherein the INT function takes the integer part of its argument. For example for N=12, $n_{max}$ equals 4. Hence a Group must comprise at least 12 cords, otherwise the distance requirement can not be met. It follows that the inventive splice must at least comprise 12 cords (i.e. M must be 12 or larger). No arrangements exist for a strip with N equal 12 wherein nearest neighbours are separated by a taxi-distance of 6, 7 or more. Such '$n_{max}$' arrangements will decrease interaction between different abutments to the lowest possible level and are therefore particularly preferred.

The sets of arrangements possible for a given 'n' will therefore form a series of nested sets. Let us denote the set of all possible arrangements with a distance of at least 'n' between any two pairs of abutments as $S_n$. Clearly $S_0$ is the largest set with the $N^N$ possible arrangements (the distance to the nearest neighbour is 1 or higher). $S_1$ will therefore be a subset of $S_0$. $S_2$ will be a subset of $S_1$ because if pairs are separated by a distance of 2 or more (i.e. belong to $S_2$) they are of course also further away from one another than a distance of 1 (i.e. belong also to $S_1$). The opposite is not true. Only arrangements in $S_4$, $S_5$, . . . are part of the invention. The smallest subset will be $S_{nmax}$. $S_{nmax+1}$ is an empty set (no arrangements exist). Hence the different sets form a chain of subsets:

$$S_{nmax}\subset S_{nmax-1}\subset \ldots \subset S_5\subset S_4.$$

A further improvement can be made by selecting that arrangement that has the highest 'Common Length' (CL). The common length in a Group is the sum of the intervals that are common between adjacent cords: one cord of the first strip, the other from the second strip. The different intervals in common are shown in FIG. 1'*a*' as the dashed lines indicated with 140. In formula this can be calculated as:

$$CL=\Delta\Sigma_{i=1}^{N-1}|q_{i+1}-q_i|$$

In other words: the common length is the length of the separation line between both part of the strips in the Group minus the width of the strip in the Group.

Arrangements with increased common length will have a larger anchoring surface than arrangements with shorter common lengths. As $|q_{i+1}-q_i|\geq n$ it follows that the common length is always larger or equal than $nL_{group}$. Hence, increasing 'n' will result in increased common length which results in better anchoring and hence a better splice.

A further improvement is to select only those arrangements wherein there is just one abutment present at the start of the first interval and just one abutment at each one of said interval ends within the Group. This is equivalent to stating that for the N-tuple of this arrangement ($q_1$; $q_2$; . . . ; $q_p$; . . . ; $q_N$), every integer from 1 to N occurs just once: there are no two $q_p$'s with the same value, nor are there numbers between 1, 2 . . . and N lacking.

Still equivalent is to say that the N-tuple is a permutation of the numbers 1, 2, . . . to N. Of course the distance requirement that nearest pairs are separated by a taxi distance 'n+1' with n larger than four must be met too. It turns out that—for all practical numbers tested—always such a permutation can be found. So for every set $S_n$ there is an intersection $S_n\cap P$ that is not empty, wherein P are all possible permutation arrangements of N numbers (N! in total).

Such a permutation arrangement is particularly preferred as at any cross section in the splice Group at least 'N−1' cords are present. Only at the abutments there is a local dip in strength but still there are N−1 cords present. Hence the relative local splice strength of the Group drops to (N−1)/N at those abutments. The relative local splice strength ('rST') of the Group is the ratio of the number of cords in cross section times their breaking load $F_b$ divided by $N\times F_b$, the theoretical strength of the strip. This is graphically illustrated in FIG. 1'*c*': when two abutments occur at the same level (B and C) the relative strength drops locally to (N−2)/N. The weakest position in the splice will therefore be that level where the minimum in relative local splice strength, indicated as 'min (rST)', occurs. It follows that the maximum relative splice strength one can achieve with a plain stepped splice is (N−1)/N. It can never be 1 or larger (which is possible for interlaced stepped splices).

The arrangement of a Group with the maximum common length is not necessarily a permutation type of arrangement. In general the non-permutation type of arrangements will have a larger or equal maximum common length than permutation type of arrangements.

The strength of the splice is of course primarily determined by the 'anchoring' of the cords in the splice matrix. This anchoring force can be of a mechanical nature or can be of a chemical nature or a mixture of both. Chemical anchoring is called adhesion. Examples of how the outer surface of steel cords can have an influence on the purely mechanical anchoring are described in WO 2005/103545 the steel cord constructions of which are hereby included by reference. As already mentioned the chemical anchoring or adhesion can be influenced by adding grafted co-polymers to the base polymer of the splice matrix material. The grafted co-polymers are chosen in order to enhance the adhesion to metallic substrates such as steel cords. Examples of polymers and grafted co-polymers are given in a co-filed application WO2011/120891 of the same applicant with the same filing date as the current application to which specific reference to paragraphs [0029] to [0035] is made herewith.

The anchoring force is determined by pulling out one single steel cord out of a strip of splice matrix material over a test length 'l'. This is done by taking a piece of strip (with the N-cords encased parallel to one another in it), covering the middle part of the strip over a length 'l', selecting a cord that is not situated on the edges (i.e. a central cord, cords on the edges only are held from one side) and liberating this cord from the strip except for the middle part of length 'l'. Then the selected cord is cut at one side of the coverage while at the other side all remaining cords are cut except the selected cord. After removing the coverage the selected cord is pulled in axial direction out of the strip while the maximum force $F_{max}$ needed therefore is measured. Dividing $F_{max}$ by 'l' gives an anchoring force '$f_a$' expressed in newton per millimeter (N/mm).

In this way the total anchoring force of the part of the splice in the Group can be estimated as '$F_a=CL\times f_a/2$'. The divider '2' takes account of the fact that in the adhesion test the common length is '2×l' as both sides of the cord are held by adjacent sides. The length $L_c$ at which the anchoring force of the embedded cord becomes equal to the breaking load $F_b$ of that cord is called the critical length. It can be estimated from $L_c=F_b/f_a$. When now the splice length L is larger then '$2\times L_c\times N/n$' the total anchoring force of the splice will be larger than the strength of the strip. However, this is not necessary as the mechanical strength of the splice is at the most (1−1/N) times the belt strength. It is therefore considered sufficient that the Group length '$L_{group}$' be at least N/n times the critical length L. Hence, the total length of the splice 'L' must be larger or equal than '$L_{group}$'. This is considered a fair balance between length of the splice and retained strength of the strip. Longer lengths are possible but higher than 2N/n times $L_c$ is not immediately necessary.

By adapting the Group length $L_{group}$ one can therefore tune the splice strength according to need. When the Group length $L_{group}$ is larger than N/n times the critical length $L_c$ a breaking load of the part of the splice in the Group that is above half of the strength of the part of the strip in the Group can be expected. A splice with a Group with 'n' equal to '$n_{max}$' can therefore be made within the shortest possible length. Or put differently: for a given $L_{group}$, the Group arrangements with the highest 'n' will contribute most to the total strength of the splice. By increasing the splice length—but without the need of going higher than $(2N/n)\times L_c$—a splice strength larger than 50%, or larger than 55%, 60%, 70%, 80% or 90% of the breaking load of the strip can be attained which is surprisingly high for this kind of splice.

The splice can be easily incorporated into a strip and shows virtually no difference in bending behavior compared to the strip itself. Therefore two strips connected by the inventive splice can be considered as a single strip and fall within the same inventive concept.

The procedure to identify the presence of a Group is simple and hence the detection of the presence of the inventive concept is simple. When a splice is identified, the abutments of the first 12 cords (e.g. on the left side of the splice, cords 1 to 12) are detected and the length of the Group is established. The taxi-distances can be determined. If all pairs have distances larger than four (or equivalently if nearest neighbors are at a distance of five or larger) a Group fulfilling the definition is identified. If a pair is identified that is closer the Group does not fulfill the definition and the procedure is repeated with the cords 2 to 13. Again if this Group fulfills the definition, the splice falls under the inventive concept. If not the procedure is repeated for cords 3 to 14 and so on till the right side of the splice is reached. If one or more Group or Groups are found the splice falls under the inventive concept. If none is found, if falls outside the inventive concept.

Such a procedure is simplest to establish on a X-ray picture of the whole splice area. Abutments and distance can readily be identified. Computers algorithms can help to implement the above procedure.

The procedure can be repeated for Groups of higher level e.g. with an interdistance 'n' larger than 5 but then 17 positions must be taken into account, and hence the splice must at least have 17 cords in it.

Likewise a splice can be considered in which the inventive concept is restricted over the full width of the strip. In that case the Group and the splice coincide and 'N' is equal to 'M'. It goes without saying that 'M' must be larger or equal to twelve. Such a splice will have no pair of abutments that are separated by a distance of four or less. If 'M' is 17 or larger, abutments can be further than a distance of 5 away from one another at best (nearest neighbor at distance of 6). If 'M' is 24 or larger, abutments can at the most be separated by a distance of 6 from one another. The sequence in columns 'nmax' and 'N' in Table III applies for even larger number of M.

BRIEF DESCRIPTION OF FIGURES IN THE DRAWINGS

FIG. 1 shows a schematic representation of a plain stepped splice connecting a first strip to a second strip in region (a), the lay-out of which can be represented on a grid as shown in region (b) whereby the associated relative drop in strength rST (in %) of the splice is represented in region (c).

MODE(S) FOR CARRYING OUT THE INVENTION

In a first step for implementing the invention one must find those arrangements which fulfil the requirement of having a taxi-distance between abutments larger than four, or five or six, possibly up to $n_{max}$. How can now such an optimum arrangement be found in this universe of $N^N$ different arrangements?

Obviously, not the way to go is to enumerate all possible arrangements $N^N$ and test each pair in the arrangement whether the distance requirement is met. Per test there are $N\times(N-1)/2$ comparisons to be done. Such a procedure is only possible for very small N.

Alternatively, one could try by trial and error in order to find an arrangement that suits the requirement. This could be done for example by means of a Monte-Carlo type of procedure: generate N random numbers in the set of 1 to N and check whether they fulfil the requirement. This could be further improved by introducing a 'stochastic cooling' algorithm that accepts changes in the arrangement that increase pairs-wise distance and allows changes in the arrangement that decrease pairs-wise distance only by chance. See '*Numerical Recipes, The Art of Scientific Computing*', by W. H. Press, S. A. Teukolsky, W. T. Vetterling and B. P. Flannery, chapter 10 '*Simulated annealing methods*'. However, one is not sure whether one finds all possibilities. Neither can one find the highest possible value for the common length for a given 'n' and 'N'. However, this is the method to consider when considering large 'N' for example N higher than 100.

One way to proceed is to work with an algorithm that works on the principle of stepwise forward exclusion of positions and backtracking with restoration when the distance requirements can not be met. Such an algorithm comprises following steps:

(A). Initialising variables such as a grid matrix and a solutions vector, and setting the first abutment position on the first cord as the current position.

(B). Tag positions on the grid which are excluded for forthcoming abutment positions as from the current position;

(C). Identify the next possible positions on the next cord a. If a next possible position is found step forward, make this position current, and go to step (B).

b. If no next position possible: de-tag positions and de-tag current position, step back to previous cord position, make the next possible position on that cord position current and go to step (B)

(D). In case an arrangement is found, output the arrangement, de-tag current position, step back to previous cord position, make the next possible position on that cord position current and go to step (B) for finding the next arrangement.

(E). Stop the routine in case all solutions have been found (even if there are no solutions). All solutions—including the 'no-solution' case—have been found in case all initially possible positions on the first cord have been tested.

Implementing such a procedure in a computer language (such as Visual Basic for Applications) is straightforward.

Such a procedure will always generate a solution if there is one and will quickly identify when none is possible. In this way the '$n_{max}$' can be found easily for any value of N. For the inventive arrangement, it is sufficient that one arrangement is found. Only when one wants to find the arrangement with the largest possible length, all arrangements must be found. It is intuitively clear that for increasing number 'n', and a given 'N' the number of possible arrangements will decrease fast. The largest number of arrangements within the invention is of course always found for 'n' equals four.

The table I gives an overview for the first few 'n' and 'N' just how many possible arrangement exist (including their complements). The number between brackets is the subset of permutations.

The embodiment of a strip with 'N=12' serves well to illustrate the invention, but the inventors stress their ideas are by no means limited to this example. For a nearest distance of 5 i.e. 'n' is four, there are just 18 solutions (including their complements) for N=12. There are no solutions for n=5 for 12 cords hence 4 is also '$n_{max}$'. These solutions are enumerated in Table II that numbers the solution as they roll out of the above described algorithm (column A), the common length CL (expressed in number of intervals 'Δ', column B), the average distance (column C, the sum of all pairs-wise distances divided by the number of pairs) and the actual arrangement 'code' (column D) by which the splice can be build.

Note the complementary pairs for example numbers 1 and 10; 9 and 18, 3 and 16. The arrangements with the longest common length are nr. 3 and its complement Nr. 16 with a common length of 73. However, these arrangements have double interruptions on levels 1, 4, 12 and 9 what limits the local strength to (10/12) of the theoretical strength of the strip. Note that the common length is always larger than $n\times(N-1)$ intervals which in this case is 44. All arrangements are thus quite above this lower limit. Note that the maximum common length that can be obtained for any configuration is '$(N-1)\times(N-1)$' for the configuration (1; N; 1; N; . . . ; 1; N) (like (1; 12; 1; 12; 1; 12; 1; 12; 1; 12; 1; 12), CL is 121). This configuration however falls outside the scope of what is claimed as 'n' equals 1 (nearest neigbour at 2).

There are two arrangements nrs. 7 and 12 that have just one abutment at the start of the first interval and just one at each end of each interval i.e. the permutation type of arrangement. Of the 12!=479 001 600 possible permutations, these are the only 2 arrangements wherein the distance between nearest neighbours is 5 (n=4). They show also the lowest common length of 67 intervals.

Finally table III gives an overview of N for different values of $n_{max}$. Also indicated is the number of arrangements possible at that $n_{max}$ and how many of them are permutations.

In what follows the splicing will be described for a specific kind of strip. However, the ideas developed are equally well applicable to any kind of strip such as a conveyor belt, a timing belt, an elevator belt, a flexible or rigid pipe reinforcement strip.

In a preferred embodiment the inventors spliced two strips containing 12 cords extruded in parallel in High Density Poly Ethylene (HDPE, Eltex Tub 172 obtained from Solvay Polyolefins). The cords were steel cords of the type 12LE with three filaments of 0.28 and 9 filaments of 0.31 mm assembled together in a single lay as described in WO 2008 080715. The cord has a breaking load of at least 2400 N and a diameter of 1.23 mm. The average tensile strength of the wires is 2680 N/mm². The filaments were galvanised with a coating amount of 44 g/kg. The estimated overall strength of the strip was 12×2400N or 28.8 kN. The measured strength of the strip was 30.2 kN.

Six different splices were made, each of them being repeated three times. As a splice polymer, the same HDPE was used as for the strip itself but first with 20% by weight grafted co-polymer mixed to the HDPE while in the second 60% by weight grafted co-polymer was added to the HDPE. As a grafted co-polymer for mixing with the splice polymer 'Yparex®' obtained from DSM was used. Yparex® is a maleic anhydride grafted polyethylene. The degree of grafting is estimated to be between 0.001% to 2%.

The following splice arrangements were made:

A1: (1'12'1'12'1'12'1'12'1'12'1'12). As already mentioned this is the arrangement with the largest common length of 121 intervals A. It falls outside the scope of the invention as abutments are only 2 steps away from one another and at position '1' and '12' the minimal local relative strength (min(rST)) is only 50% of the strip strength.

A2: (1' 4' 7'10' 2' 5' 8'11' 3' 6' 9'12). As there are nearest neighbour pairs that are only 4 steps away, this falls also outside the claims. The common length is 43 intervals Δ. There is just one interruption per level, so the minimal local relative strength is 92%. This is a biased organ pipe type of splice.

A3 (4'10' 1' 7'12' 4' 9' 1' 6'12' 3' 9). This corresponds to arrangement '3' (the complement of '16') of Table II. It falls under the invention as nearest neighbours are 5 steps away from one another. The common length is 73 intervals Δ. At positions 1, 4, 9 and 12 two abutments are present locally weakening the splice to 83% of the attainable strength.

A4 (5'10' 2' 7'12' 4' 9' 1' 6'11' 3' 8). This is arrangement '7' (or its complement '12') of table II. It falls under the invention as nearest neighbours are 5 steps away from one another. The common length is 67Δ, and the lowest local relative strength is 92% as there is just one abutment at every level.

The splices were made over a length of 500 mm, putting 'Δ' equal to 500/11 i.e. 45.5 mm.

The results obtained are summarised in Table IV:

TABLE IV

| Nr | Arr. | Co-polymer (wt %) | n | CL (mm) | min(rST) (%) | $f_a$ (N/mm) | $L_c$ (mm) | $L_t$ (mm) | BL (%) |
|---|---|---|---|---|---|---|---|---|---|
| 1 | A1 | 20 | 1 | 5500 | 50 | 8 | 300 | 3600 | 41% |
| 2 | A2 | 20 | 3 | 1955 | 92 | 8 | 300 | 1200 | 29% |
| 3 | A3 | 20 | 4 | 3318 | 83 | 8 | 300 | 900 | 23% |
| 4 | A4 | 20 | 4 | 3045 | 92 | 8 | 300 | 900 | 23% |
| 5 | A1 | 60 | 1 | 5500 | 50 | 20 | 120 | 1440 | 51% |
| 6 | A2 | 60 | 3 | 1955 | 92 | 20 | 120 | 480 | |
| 7 | A3 | 60 | 4 | 3318 | 83 | 20 | 120 | 360 | |
| 8 | A4 | 60 | 4 | 3045 | 92 | 20 | 120 | 360 | 62% |

In this table '$L_t$' refers to the minimal length the splice should have i.e. $(N/n)\times L_c$. 'BL' is the measured breaking load of the splice expressed as a percentage of the measured breaking load of the strip. At least 3 identical splices were tested of which the results were averaged.

When the adhesion strength is low (splices Nrs. 1 to 4) the failure mechanism is by sliding out of the cords out of the splice without breaking. The strength of the splice is determined by the common length then. Note that the splice was not long enough: 'L' (500 mm) should have be larger than '$L_t$'.

When the adhesion strength is high (splices Nrs. 5 to 8) the failure mechanism can have two outcomes:

Either the abutments are too near to one another and the adhesion strength ($CL\times f_a$) is higher than the local strength at the splice and all cords fail by breaking (splice Nr. 5). Note that in this case also '$L<L_t$', a not favoured condition. Or;

The abutments are far enough from one another in which case some of the cords will fail due to adhesion loss and others will fail due to breaking (splices 7 and 8). This gives the best results.

It will be clear to the skilled person that by combining the advantageous arrangements described above side-by-side an overall good splice can be made. However, at the borders of the splice the requirements of distance will not be met. If for example a strip of 24 cords is connected through an arrangement in which the arrangement '7' is incorporated side by side one obtains the splice arrangement:

5'10' 2' 7'12' 4' 9' 1' 6'11' 3' 8' 5' 10' 2' 7'12' 4' 9' 1' 6'11' 3' 8

In this splice abutment positions (12,8) and (13,5), (11,3) and (13,5), (12,8) and (14,10) (indicated in bold) are only a distance 4 away from one another. But still a favourable result will be obtained over the same length. The common length is 137×Δ.

In this example 'M' is 24 while two groups of 12 contiguous cords can be found (cord positions 1 to 12 and cord positions 13 to 24) which meet the distance requirement of being at least 4 (nearest neighbour on 5) away from one another.

This illustrates how a splice can be built by using building Groups of the proposed advantageous arrangements.

Of course it is better to spread out the splice even more and use an arrangement of 24 cords with a distance of at least 6 (nearest neighbour at 7) between abutments. Such an arrangement is e.g.

10' 19' 4' 24' 15' 8' 1' 20' 12' 5' 24' 16' 9' 1' 20' 13' 5' 24' 17' 10' 1' 21' 6' 15

It has the common length of 263×Δ which is the largest possible for a splice with 24 cords and this distance requirement.

Another advantageous arrangement is the one (or its complement) wherein only one abutment is present for any position (i.e. it is a permutation). This one arrangement is:

7' 14' 21' 3' 10' 17' 24' 6' 13' 20' 2' 9' 16' 23' 5' 12' 19' 1' 8' 15' 22' 4' 11' 18

The common length is 229×Δ. This is the only permutation of 24 numbers wherein the distance between nearest neighbours is 7.

TABLE I

| | n | | |
|---|---|---|---|
| N | 4 | 5 | 6 |
| 12 | 18(2) | 0 | 0 |
| 13 | 2672(26) | 0 | 0 |
| 14 | 419234(310) | 0 | 0 |
| 15 | 43585868(9606) | 0 | 0 |
| 16 | | 0 | 0 |
| 17 | | 68(4) | 0 |
| 18 | | 31324(72) | 0 |
| 19 | | 5884990(750) | 0 |
| 20 | | (10280) | 0 |
| 21 | | | 0 |
| 22 | | | 0 |
| 23 | | | 0 |
| 24 | | | 2120(2) |

TABLE II

| A Number | B CL | C Avg | D Code |
|---|---|---|---|
| 1 | 70 | 8,848 | 4' 10' 1' 7' 12' 4' 9' 1' 6' 11' 3' 8 |
| 2 | 72 | 8,985 | 4' 10' 1' 7' 12' 4' 9' 1' 6' 12' 3' 8 |
| 3 | 73 | 9,030 | 4' 10' 1' 7' 12' 4' 9' 1' 6' 12' 3' 9 |
| 4 | 69 | 8,803 | 5' 10' 1' 7' 12' 4' 9' 1' 6' 11' 3' 8 |
| 5 | 71 | 8,939 | 5' 10' 1' 7' 12' 4' 9' 1' 6' 12' 3' 8 |
| 6 | 72 | 8,985 | 5' 10' 1' 7' 12' 4' 9' 1' 6' 12' 3' 9 |
| 7 | 67 | 8,667 | 5' 10' 2' 7' 12' 4' 9' 1' 6' 11' 3' 8 |
| 8 | 69 | 8,803 | 5' 10' 2' 7' 12' 4' 9' 1' 6' 12' 3' 8 |
| 9 | 70 | 8,848 | 5' 10' 2' 7' 12' 4' 9' 1' 6' 12' 3' 9 |
| 10 | 70 | 8,848 | 8' 3' 11' 6' 1' 9' 4' 12' 7' 1' 10' 4 |
| 11 | 69 | 8,803 | 8' 3' 11' 6' 1' 9' 4' 12' 7' 1' 10' 5 |
| 12 | 67 | 8,667 | 8' 3' 11' 6' 1' 9' 4' 12' 7' 2' 10' 5 |
| 13 | 72 | 8,985 | 8' 3' 12' 6' 1' 9' 4' 12' 7' 1' 10' 4 |
| 14 | 71 | 8,939 | 8' 3' 12' 6' 1' 9' 4' 12' 7' 1' 10' 5 |
| 15 | 69 | 8,803 | 8' 3' 12' 6' 1' 9' 4' 12' 7' 2' 10' 5 |
| 16 | 73 | 9,030 | 9' 3' 12' 6' 1' 9' 4' 12' 7' 1' 10' 4 |
| 17 | 72 | 8,985 | 9' 3' 12' 6' 1' 9' 4' 12' 7' 1' 10' 5 |
| 18 | 70 | 8,848 | 9' 3' 12' 6' 1' 9' 4' 12' 7' 2' 10' 5 |

TABLE III

| $n_{max}$ | N | Arrangements (permutations) |
|---|---|---|
| 4 | 12 | 18(2) |
| 5 | 17 | 68(4) |
| 6 | 24 | 2120(2) |
| 7 | 31 | 25878(12) |
| 8 | 40 | 1980644(2) |
| 9 | 49 | |
| 10 | 60 | |

The invention claimed is:

1. A splice connecting a first strip to a second strip, both strips comprising a number 'M' of parallel cords in a strip matrix, where, in a splice arrangement, each cord end of said first strip abuts to a cord end of said second strip at an abutment, and wherein at least one group of 'N' contiguous cords is present with 'N' being equal to or larger than 12, wherein the distance taken along the splice between the first and last abutment of said at least one group is '$L_{group}$' and said abutments within said group are regularly spaced apart over said length '$L_{group}$' by a number of intervals, said interval being the smallest longitudinal distance between any pair of abutments within said group, wherein the taxi-distance between any pair of said abutments in said group is larger than four, said taxi-distance being the sum 'i+j+1' of the number of cords 'i' in between abutments of said pair plus '1' and the number 'j' of intervals between abutments of said pair along the longitudinal direction of said splice.

2. The splice according to claim 1 wherein said interval is '$L_{group}/(N-1)$'.

3. The splice according to claim 1 wherein said taxi-distance between any pair of said abutments within said at least one group of 'N' contiguous cords is larger than a number 'n', 'n' being five or six or seven or any number up to '$n_{max}$', '$n_{max}$' being the largest number for which there is still at least one possible splice arrangement for a given value of 'N'.

4. The splice according to claim 3 wherein, for a given 'n', the splice arrangement within said at least one group of 'N' contiguous cords with the largest common length is chosen, said common length being the sum of the intervals common between adjacent cords of said first and second strip within said at least one group of 'N' contiguous cords.

5. The splice according to claim 1 wherein just one abutment is present on the start of the first interval and just one abutment on each one of said interval ends within said at least one group of 'N' contiguous cords.

6. The splice according to claim 3 wherein said length '$L_{group}$' is equal to or larger than 'N/n' times the critical length of said cord in said strip, said critical length being that length where the force needed to pull out a single, non-edge cord out of strip matrix material is equal to the breaking load of said cord.

7. The splice according to claim 1 wherein all 'M' cords in said splice arrangement are in said group of 'N' contiguous cords.

8. The splice according to claim 1 wherein a splice matrix or said strip matrix is a polymer material and said cords are steel cords.

9. The splice according to claim 8 wherein said polymer material is an elastomer or a rubber material.

10. The splice according to claim 8 wherein said polymer is a thermoplastic polymer.

11. The splice according to claim 10 wherein said splice matrix material comprises a mixture of a co-polymer and a base polymer, said co-polymer being a grafted co-polymer, a block co-polymer or a random co-polymer functionalised for enabling adhesion to said steel cords.

12. The splice according to claim 1 wherein said strips have a breaking load, said splice having a breaking load that is at least larger than half of said breaking load of said strips.

13. The splice according to claim 12 wherein said splice has a breaking load that is larger than 55% of the lower breaking load of any one of said first and second strip.

14. A strip comprising a splice according to claim 1.

15. The splice according to claim 2 wherein said taxi-distance between any pair of said abutments within said at least one group of 'N' contiguous cords is larger than a number 'n', 'n' being five or six or seven or any number up to '$n_{max}$', '$n_{max}$' being the largest number for which there is still at least one possible splice arrangement for a given value of 'N'.

* * * * *